(No Model.)
R. W. GRAVES.
STARCH TABLE.
No. 248,734. Patented Oct. 25, 1881.
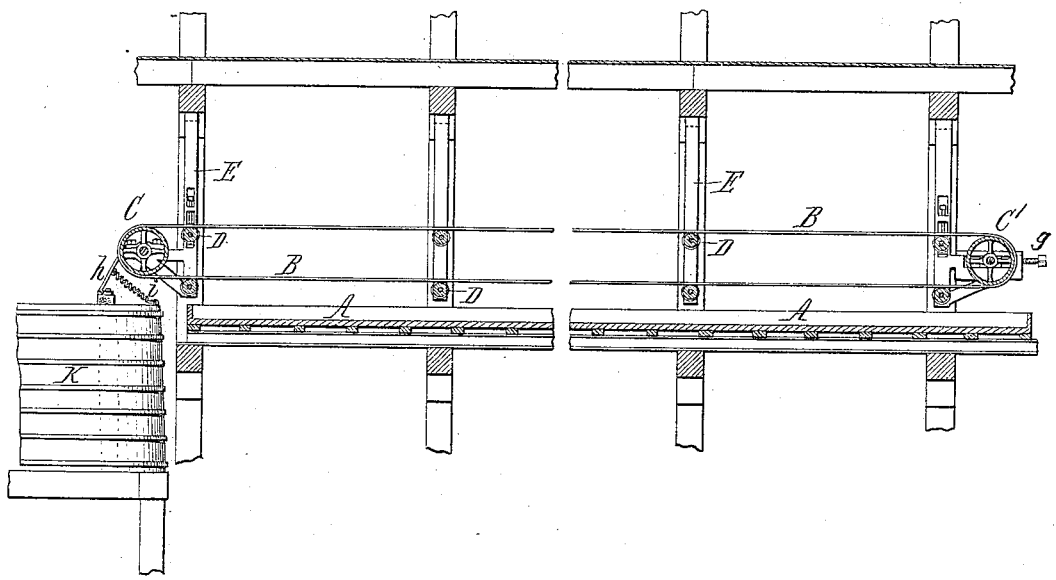
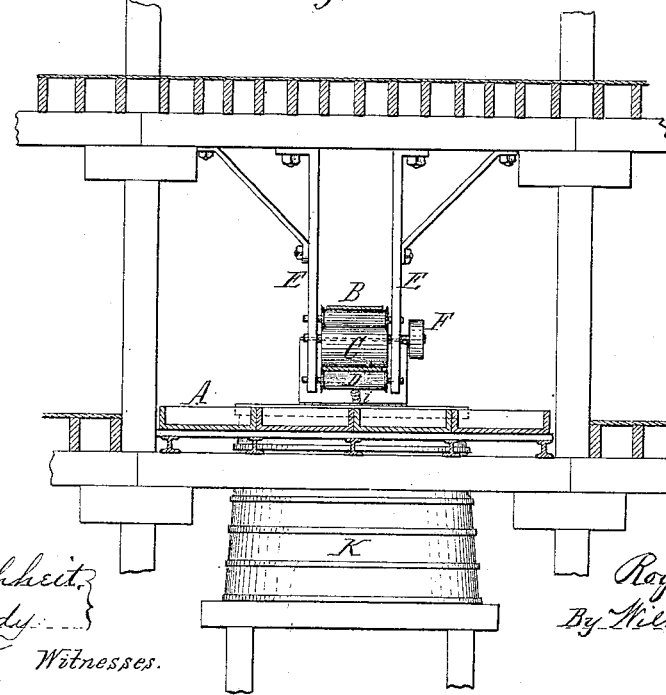
Witnesses.
Chas. J. Buchheit.
Edw. J. Brady.
Inventor:
Roger W. Graves.
By Wilhelm & Bonner.
Attorneys.

UNITED STATES PATENT OFFICE.

ROGER W. GRAVES, OF BUFFALO, NEW YORK.

STARCH-TABLE.

SPECIFICATION forming part of Letters Patent No. 248,734, dated October 25, 1881.

Application filed July 27, 1881. (No model.)

*To all whom it may concern:*

Be it known that I, ROGER W. GRAVES, of the city of Buffalo, in the county of Erie and State of New York, have invented a new and useful Improvement in Starch-Tables, of which the following is a specification.

This invention relates to an improvement in the tables or trays which are employed in starch-factories for the separation of the starch from the gluten and other refuse. These tables are composed of flat gutters slightly inclined and of considerable length, frequently exceeding a hundred feet. The starch-water is discharged upon the highest end of the tables and runs over the same in a thin film, depositing the starch, while the gluten and other refuse run off. The starch is removed from these tables by shoveling the starch into hand-cars or other receptacles, by which the starch is conveyed to the washing-vats or other receptacles. This mode of removing the starch is very laborious, and consumes a great deal of time; and it is the object of my invention to furnish a more expeditious and effective means of removing the starch from the tables to the place where the starch is further treated or stored until treated; and my invention consists, to that end, of an endless-belt conveyer arranged over or on one side of the starch-tables, and moving so as to convey the starch which is shoveled on the belt from the table to the proper receptacle or place of deposit, as will be hereinafter fully set forth.

In the accompanying drawings, Figure 1 is a longitudinal section, and Fig. 2 a cross-section, of a set of starch-tables provided with my improvements.

Like letters of reference refer to like parts in both of the figures.

A represents a series of starch-tables, three or four being usually arranged side by side between every two rows of posts of the building.

B represents the endless conveyer-belt, arranged centrally and longitudinally over the starch-tables. The belt B runs over two pulleys, C C', and over intermediate supporting-rollers, D, arranged at suitable distances apart. The pulleys C C' and rollers D turn in journal-boxes which are attached to hangers E, suspended from the timbers overhead and braced in any suitable and well-known manner. The shaft of the head-pulley C is provided with a driving-pulley or gear-wheel, F, to which motion is imparted from any convenient source. The tail-pulley C' is supported in journal-boxes, which are made adjustable by screw-bolts $g$, or other suitable means, to permit the belt to be tightened when necessary.

$h$ is a scraper-plate, which bears against the belt B on the face of the head-pulley C, and detaches from the belt all particles of starch which may adhere thereto. The scraper-plate $h$ is held against the belt by a spring, $i$, or weights, as may be desired.

K represents the washing-vat or other receptacle into which the starch is discharged from the belt B. The latter is arranged at such a height above the tables that the starch deposited upon the tables under the belt can be easily reached and removed from the tables and lifted upon the belt. The lumps of starch are not disturbed after being placed upon the conveyer-belt until they are discharged into the receptacle K or other place of deposit, and are therefore carried by the belt in an unbroken state to the place of deposit, thereby preventing any loss of the starch while in transit, which occurs when the moist lumps of starch are broken up or agitated, as the moist lumps rapidly dissolve into a liquid under these circumstances.

I am aware that endless belts have been used as conveyers in various stages of the manufacture of starch, and I do not broadly claim such use; but

I claim as my invention—

The combination, with a starch-depositing table, A, of an endless conveyer-belt, B, arranged horizontally over the table at a height at which the starch from all parts of the table can be conveniently deposited upon the conveyer-belt, for the purpose of being conveyed to the proper receptacle, substantially as set forth.

ROGER W. GRAVES.

Witnesses:
JNO. J. BONNER,
EDW. J. BRADY.